United States Patent [19]

Dolin

[11] Patent Number: 5,265,503
[45] Date of Patent: Nov. 30, 1993

[54] LUG NUT AND SOCKET

[76] Inventor: Lee A. Dolin, P.O. Box 320, Rte. 616, Calverton, Va. 22016

[21] Appl. No.: 921,597

[22] Filed: Aug. 3, 1992

Related U.S. Application Data

[63] Continuation of Ser. No. 650,218, Feb. 4, 1992, abandoned.

[51] Int. Cl.⁵ .......................................... B25B 13/56
[52] U.S. Cl. ............................. 81/176.15; 81/124.6; 81/461; 411/403; 411/427; 411/455; 411/919
[58] Field of Search ............. 81/121.1, 124.3, 124.6, 81/124.7, 177.85, 186, 436, 461; 411/402, 403, 407, 410, 427, 435, 919

[56] References Cited

U.S. PATENT DOCUMENTS

| | | | |
|---|---|---|---|
| 1,596,708 | 8/1926 | Bellows | 81/124.6 |
| 1,685,503 | 9/1928 | Pfauser | 81/124.6 |
| 2,372,269 | 3/1945 | Golan | 81/121.1 |
| 2,770,991 | 11/1956 | Myers | 81/176.15 |
| 3,134,291 | 5/1964 | Barry | 81/176.15 X |
| 3,140,625 | 7/1964 | Pannozzo | 81/176.15 X |
| 3,273,442 | 9/1966 | Launay | 411/403 |
| 3,412,635 | 11/1968 | Chmielewski | 81/176.15 |
| 3,519,979 | 7/1970 | Bodenstein | 81/121.1 X |
| 3,695,124 | 10/1972 | Myers | 81/124.3 |
| 4,262,562 | 4/1981 | MacNeill | 81/176.15 |
| 4,616,535 | 10/1986 | Chiavon | 81/121.1 |

FOREIGN PATENT DOCUMENTS

909680  4/1954  Fed. Rep. of Germany ..... 81/121.1

*Primary Examiner*—James G. Smith
*Attorney, Agent, or Firm*—Dickstein, Shapiro & Morin

[57] ABSTRACT

A lug nut and socket wherein the socket and nut engage only selected point surfaces. In one aspect of the invention the socket has a decreased number of point surfaces. In another aspect of the invention, the lug nut has a decreased number of point surfaces. In another aspect of the present invention the socket points surfaces include point pins which are positioned to engage a pair of diametrically opposed point surfaces on the lug nut. The point pins are removably inserted into point pin wells extending into the lug nut socket. In another aspect of the present invention a retainer ring is provided to prevent the removable point pins from falling out during operation or handling, or otherwise being unintentionally removed. In another aspect of the present invention, the socket bore which engages a lug nut during operation is deliberately oversized to allow for considerable play between the lug nut and the socket.

12 Claims, 3 Drawing Sheets

LUG NUT AND SOCKET

This is a continuation of application Ser. No. 07/650,218, filed Feb. 4, 1992 now abandoned.

BACKGROUND OF THE INVENTION

The present invention relates to a nut and socket and more particularly to a lug nut and socket for use in automobile racing for securing the wheels to the vehicle.

In automobile racing, it is crucially important to minimize the amount of time required for pit stops, for refueling, tire changing and other necessary service to the race car. For tire changing during the pit stops, the members of the tire crew must first loosen and remove from the wheel hub studs the lug nuts which secure the wheel onto the wheel hub. Typically, the lug nuts are removed using a lug nut socket coupled to an air powered drive tool. The drive tool rotates the socket at a high rate of speed thereby resulting in quick loosening and removal of the lug nuts. Most power drive tools have a torque adjustment feature which determines the tightness of the nuts. In operation the drive tool rotates the nut onto the stud until the nut tightness reaches the selected torque setting. At that point the drive tool slips thereby preventing the nut from being tightened beyond that torque setting. The operator knows the nut is secure because the power tool slippage makes a distinct clattering sound. When the operator hears the sound it is time to move on to the next nut. Between nuts the rotational speed of a conventional socket must be reduced to permit engagement with the next nut to be loosened or tightened. Once the wheel has been removed and replaced with a fresh wheel, the operator must then reapply lug nuts to the studs and tighten them down. The lug nuts used to secure the wheels to the wheel hubs are typically six-corner or six-point hexagonal lug nuts. The points are formed by the intersection of adjoining sides. The surfaces of the sides in the proximity of a point are the point surfaces. Conventional sockets typically have a series of angular socket points oriented to provide mating engagement with the point surfaces of the lug nut.

There are a number of disadvantages associated with conventionally designed lug nuts and sockets. One disadvantage results from the degree of accuracy of alignment required between the lug nut socket and the lug nut in order to allow the socket points to engage the lug nut point surfaces. Specifically, the point surfaces or corners of the lug nut must approximately line up with the socket points before the socket points will approximately engage the lug nut point surfaces. In order to accomplish the desired degree of alignment, both the socket and the lug nut should be stationary. However, in the racing environment when timing is crucial and pit crews have little time to completely service the racing vehicle, crew members may try to fit the socket onto the nut while the drive tool and lug nut socket are still rotating. Moreover, crew members may begin working on the tires, before the car is completely stopped, thereby rendering alignment and engagement even more difficult. Under those circumstances, instead of engaging the nut, the rotating socket may bounce around the lug nut as the crew member struggles to force the rotating socket into alignment with the lug nut. This uses additional time. On the other hand, if the socket is used as intended, with the socket, lug nut, and wheel all stationary, this will ultimately cost the race car driver and the pit crew precious time during the course of the pit stop.

Thus, there is a need for a lug nut and socket which will enable quicker nut removal and tightening to speed up wheel removal and replacement and to reduce the amount of time required for pit stops.

SUMMARY OF THE INVENTION

The present invention alleviates, to a great extent, the disadvantages associated with conventionally designed lug nuts and sockets. The present invention provides a lug nut and socket wherein the socket and nut engage only selected socket engaging surfaces. In one aspect of the invention the socket has a decreased number of engaging surfaces. In another aspect of the invention, the lug nut has a decreased number of engaging surfaces. In another aspect of the present invention the socket points surfaces include point pins which are positioned to engage a pair of diametrically opposed point surfaces on the lug nut. The point pins are removably inserted into point pin wells extending into the lug nut socket.

In another aspect of the present invention a retainer ring is provided to prevent the removable point pins from falling out during operation or handling, or otherwise being unintentionally removed. In another aspect of the present invention, the socket bore which engages a lug nut during operation is deliberately oversized to allow for considerable play between the lug nut and the socket.

It is an object of the present invention to provide a lug nut and socket for loosening or tightening the lug nut on a stud.

It is another object of the present invention to provide a lug nut and socket constructed for easier alignment and engagement with one another.

It is yet another object of the present invention to provide a lug nut and socket with the foregoing advantages and which enables the lug nut socket to engage a lug nut while the socket is rotating with respect to the lug nut.

It is still another object of the present invention to provide a lug nut and socket with the foregoing advantages which enables rapid removal and replacement of racing tires during pit stops thereby minimizing the amount of time required to accomplish pit stop servicing.

It is a further object of the present invention to provide a lug nut socket with the foregoing advantages which has removable point pins for engaging the lug nut to allow for replacement of the point pins.

Other objects and advantages of the present invention will become readily apparent from the following description and drawings which illustrate preferred embodiments of the present invention.

DETAILED DESCRIPTION OF PREFERRED EMBODIMENTS

Figure 1:
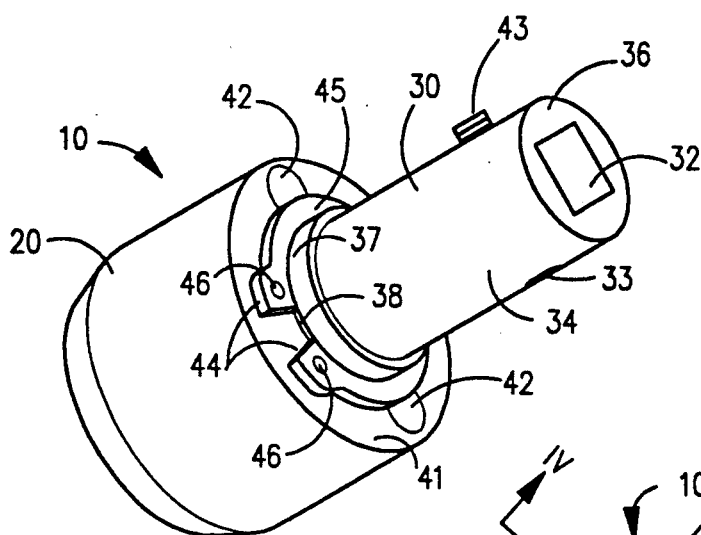
FIG. 1 is a perspective view of a lug nut socket according to a preferred embodiment of the present invention.
Figure 2:
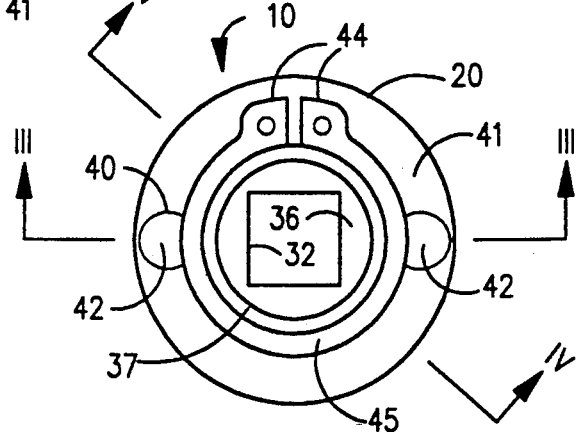
FIG. 2 is a rear end view of the lug nut socket of FIG. 1.
Figure 3:
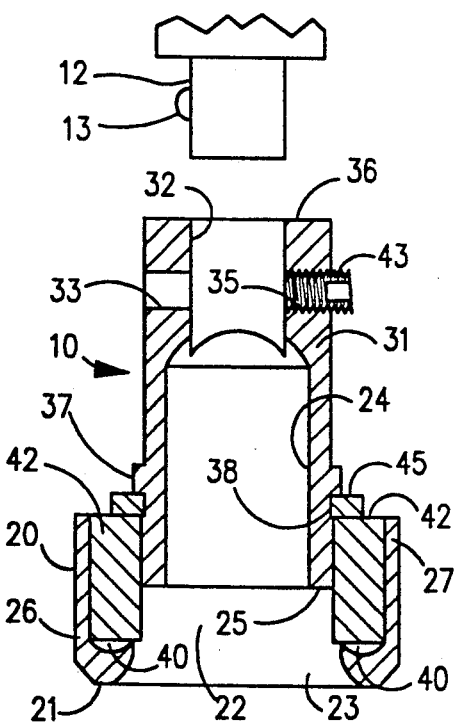
FIG. 3 is a cross-sectional view taken along the line III—III of FIG. 2.
Figure 4:
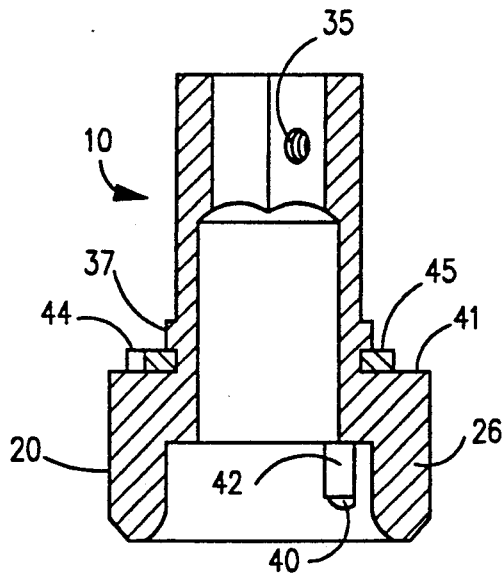
FIG. 4 is a cross-sectional view taken along the line IV—IV of FIG. 2.

Refer now to FIGS. 1 through 4, there being shown a lug nut socket, generally designated by reference numeral 10, according to a preferred embodiment of the present invention. The lug nut socket 10 has a socket head 20 and a socket neck 30. The socket neck 30 has a square drive receptacle 32 for engagement with a conventional square drive tool spindle 12; (see FIG. 3). The rear end of the socket 10 forms a drive seat 36 for providing a load bearing surface for contacting the drive tool 12. A first wall bore 33 extends from the outer neck surface 34 of the socket neck 30 through the socket neck wall 31 and opens to the drive receptacle 32 to provide a recess for engagement with a spring action set pin 13 of the drive tool spindle 12. Two point pins 42 extend into respective point pin wells 40 formed in the head 20. A snap ring retainer 45 is positioned to extend around the snap ring groove 38 formed between the snap ring flange 37 and the rear head surface 41 to at least partially cover and hold the point pins 42 in position in the point pin wells 40. The snap ring 45 is of conventional construction and may be expanded for insertion on or removal from the groove 38 by engaging and spreading the holes 46 of the snap ring ends 44 with a conventional tool.

The socket head 20 has a front rim 21. Progressing from the front rim 21 to the drive seat 36, the interior of socket 10 has a socket shoulder 23, a socket bore 22, a nut seat 25, a stud clearance bore 24, a conical transition surface 28 and a drive receptacle 32. The socket shoulder 23 extends outwardly from the socket bore 22 towards the front rim 21 to aid in guiding the socket 10 into engagement with a lug nut. The socket bore 22 is cylindrical and is sized to fit around the points of the lug nut to be engaged. For a typical automatic style nut, the bore 22 will have a diameter of about one and one-quarter inch. Cylindrical Pins 42 having a diameter of about one-quarter inch and with about one-fourth of its diameter protruding into the bore 22 may be suitable for use with such typical automatic nuts and with the nuts according to the present invention as described below. The stud clearance bore 24 extends from the socket bore 22 through the socket head 20 into the socket neck 30 and then merges with the drive receptacle 32. The transitional surface 28 between the bore 24 and the receptacle 32 may be formed by a drill used to cut the bore 24 in the socket 10. The stud clearance bore 24 has a smaller inner diameter than the socket bore 22, thereby forming nut seat 25.

When the tool 12 is inserted into the receptacle 32, the set pin 13 extends into the bore 33 to secure the socket 10 to the drive tool spindle 12. Because the set pin 13 may not provide sufficient grip to secure the tool 12 to the socket 10 during operation, a locking bolt 43 is employed. A second wall bore 35 is threaded and extends from the outer neck surface 34 through the socket neck wall 31 and opens into the drive receptacle 32. The locking bolt 43 is threaded into the threaded bore 35 to contact the drive tool spindle 12. The locking bolt 43 is turned snug against the drive tool spindle 12 to secure and lock the lug nut socket 10 onto the drive tool 12 to prevent removal of the lug nut socket 10 from the drive tool 12 during use.

The point pin wells 40 extend from the rear surface 41 and through the socket wall 26 to open into the nut seat 25 and the socket bore 22. In the preferred embodiment, the end of the well 40 near the rim 21 is at least partially closed so that the pin 42 can be inserted and withdrawn to and from the well 40 only through the rear surface 41. Each point pin 42 is inserted into a point pin well 40 such that the point pin 42 protrudes along a portion of its length into the socket bore 22. The point pins 42 protrude into the socket bore 22 a sufficient distance to engage and turn the lug nut. The point pins 42 may be formed from a hard or a soft material to selectively extend the life of the nut points, or the point pins. The point pins are removable and may be replaced upon being deformed or damaged.

A snap ring retainer 45 is used to retain the point pins 42 once the pins have been inserted into the point pin wells 40. When in place, the snap ring 45 is positioned to extend over the point pins 42 a sufficient amount to hold the pins 42 in place in the wells 40 during use of the socket 10. The snap ring 45 is positioned between the flange 37 and the rear surface 41. The snap ring 45 has sufficient thickness to provide a snug fit between the flange 37 and the rear surface 41. The ring 45 extends over the rear surface 41 and is held from axial rearward movement by the flange 37. The flange 37 is sized to extend out over at least a portion of the retainer ring 45 to prohibit the retainer 45 from moving axially over the flange 37 without the aid of a tool. The flange 37 is positioned along the outer surface 34 of the socket neck 30 such that the retainer 45 is restrained from undesirable movement away from the rear surface 41 and the point pins 42. The snap ring 45 may be removed from between the flange 37 and the rear surface 41 by using a conventional snap ring tool to engage the holes 46 of the snap ring ends 44. Once the snap ring 45 is removed, the point pin wells 40 are accessible.

Refer now to FIGS. 5-8 there being shown a two point pin engaging lug nut, generally referred to by reference number 50, according to a preferred embodiment of the present invention. The lug nut 50 is adapted to be used in conjunction with a lug nut retention system such as, for example, the system shown in U.S. Pat. No. 4,971,495, the disclosure of which is incorporated herein by reference. The nut 50 includes a body 51 having a socket end 57 and a hub end 58. The nut 50 has four engagement faces 56, two side edge faces 64 and two engagement edge faces 70 and four side edges 65 and four engagement edges 66 where the faces meet. The nut 50 has a bore 59 threaded along at least a portion of its length for engaging a threaded lug of a wheel. Unlike a conventional nut, all of the faces of the nut 50 are not of equal size and all of the edges do not form the nut corners or nut points for engagement with the socket. The nut 50 has two nut socket engagement sections 55 which are positioned diametrically opposed to one another. Each socket engaging portion 55 is formed by two engagement faces 56 separated by one engagement edge face 70. The engagement edges 66 are formed at the intersection of the engagement edge faces and the engagement faces. The engagement faces 56 are separated by the side edge faces 64 forming the side edges 65 at their intersection. The angle 60 formed by the engagement faces 5 of each socket engaging portion 55 is approximately sixty degrees. A socket stop 52 is formed around the body 51. A flange 54 extends around and outwardly from the nut body 51. The outer diameter 62 of the flange 54 is sized so that the flange will engage the spring retainer 142.

The socket stop 52 may have an outside diameter which is the same as or less than the inner diameter 22 of the socket 10 if the socket is sized so that the nut seat 25 engages the end 57 of the nut 50 with the rim 21 spaced sufficiently away from a retaining clip 142 that may extend around stop 52. Alternatively, stop 52 could be sized to be larger in diameter than the diameter of the bore 22 and the rim 21 could be allowed to engage the socket end surface 62 of the socket stop 52 to keep the rim 21 of the socket 10 from rubbing significantly against the retainer spring 142.

Edge faces 70 have notch portions 72 extending into the socket engaging portions 55 near the stop 52 to lighten the nut to enable greater angular acceleration of the nut 50 by the force of the socket 10. The edge shoulders 71 of the edge faces 70 may contact the socket shoulder 23 of the rim 25 to aid in alignment and engagement of the nut 50 and the socket 10.

Figure 5:
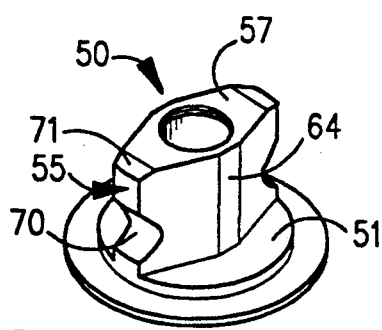
FIG. 5 is a perspective view of a lug nut according to a preferred embodiment of the present invention.
Figure 6:
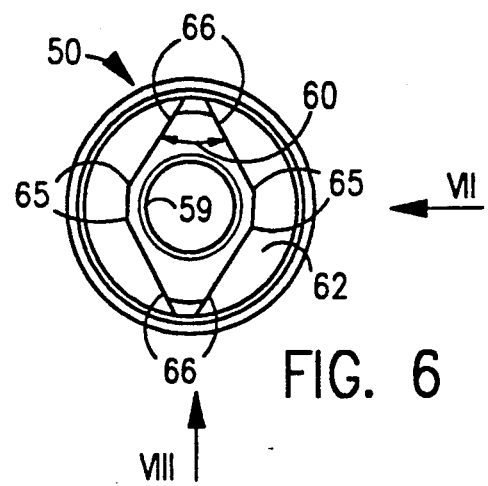
FIG. 6 is a front end view of the lug nut of FIG. 8.
Figure 7:
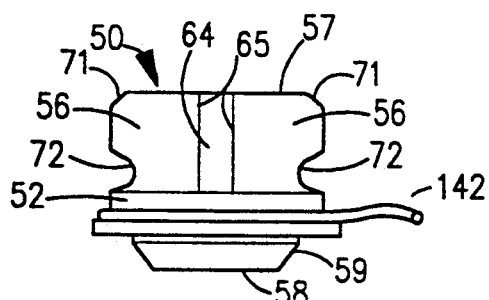
FIG. 7 is a view taken in the direction of arrow VII of FIG. 6.
Figure 8:
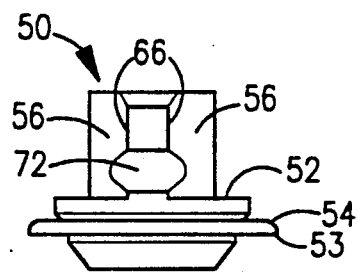
FIG. 8 is a view taken in the direction of arrow VIII of FIG. 6.
Figure 9:
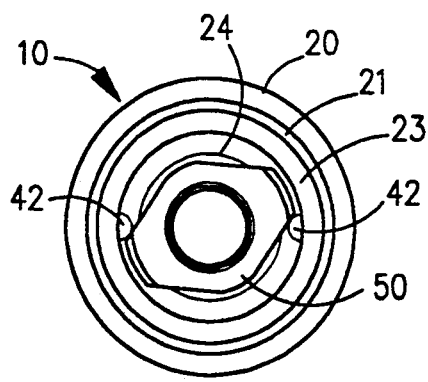
FIG. 9 is a front end view of the lug nut socket of FIG. 1 engaging the nut of FIG. 5.
Figure 10:
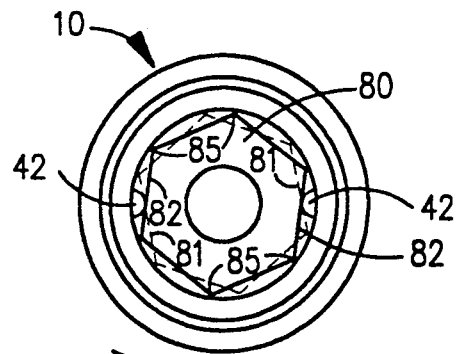
FIG. 10 is a view like FIG. 9 showing the lug nut socket engaging the point surfaces of a six-pointed lug nut.

Refer now to FIG. 9 which shows a view of the lug nut socket 10 of FIG. 1 engaging the lug nut 50 of FIG. 5. The point pins 42 protrude into the socket bore 22 a sufficient distance to engage the socket engaging portions 55 of the socket 50 during rotation. The point pins 42 may be rotated wide number of positions still allow the socket 10 to be inserted over and engage the nut 50. The pins 42 are located at one hundred and eighty degree angular spacings within the socket bore 22, versus the sixty degree angular spacing of conventional sockets. Moreover, the pin type construction uses a small amount of space and allows greater rotation of the socket with respect to the nut so that even a six-pin construction with sixty degree angular spacing allows a greater degree of rotation of the socket with respect to the nut (as illustrated in FIG. 10) than a conventional socket and therefore an easier alignment. The nut 50 also has its two socket engaging portions 55 arranged opposing each other at about one hundred and eighty degrees angular spacing from each other. When the two engaging portion nut 50 is used in combination with the two pointed pin socket 10 the socket 10 may be inserted onto the nut 50 at almost any position of relative angular alignment except when the pins 42 are directly over the nut socket engaging portions 55. As a result, the socket 10 may be easily aligned and inserted over the nut 50 at almost any relative angular position of the nut 50 and the socket 10. As a result of the enhanced alignment capability, the rotational speed of the socket 10 or the control of the drive tool rotational speed (such as by a trigger control on an air-driven power tool turning the spindle 12) does not have to be decreased or adjusted as much or at all after the socket has been withdrawn from one nut and prior to the engagement of the socket with the next nut. Moreover, with the pin construction, conventional six-pointed nuts with damaged or rounded points, can be turned when conventional sockets would not be able to fit over the nut or to engage it for rotation because the nut has been deformed.

FIG. 10 shows the lug nut socket 10 having two point pins 42 engaging a standard hexagonal lug nut 80. The point pins 42 are diametrically opposed and separated by a dimension which is less than the greatest transverse distance between the opposite points 85 on the lug nut 80 to provide enough overlap to allow the point pins 42 to engage the point surfaces 81 and 82 adjacent to and forming each of the points 85 at their intersections. Thus as shown in FIG. 10, when the socket 10 is rotated counter clockwise about the nut 80, the point pins 42 engage the point surfaces 81, but if the rotation is clockwise the point pins 42 engage the point surfaces 82.

Figure 11:
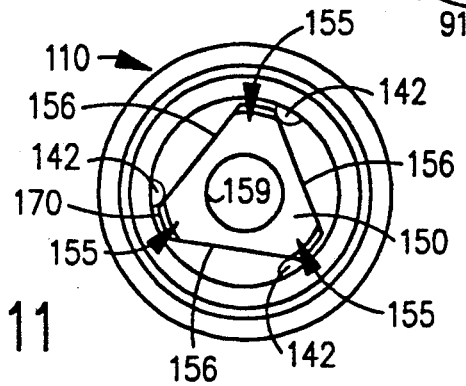
FIG. 11 is a front end view of an alternate preferred embodiment of a lug nut socket according to the present invention and having three point pins engaging the socket engaging portions of an alternate surface preferred embodiment of a lug nut according to the present invention and having three points.

FIG. 11 shows a three point pin lug nut socket, generally designated to by reference number 110, according to another preferred embodiment of the present invention. The socket 110 has three point pins 142, with each pin 142 positioned at about one hundred and about twenty degrees and equidistant the remaining point pins. A nut 150 is constructed similar to the nut 50 but with three socket engaging portions 155, arranged at about one hundred twenty degrees angular spacings. Nut 150 has three engagement surfaces 156 and three edge surfaces 170. FIG. 11 shows, during counterclockwise motion, the pins 142 engaging the engagement surfaces 156.

In use, the lug nut socket 10 is placed over a lug nut, such as the two engaging portion nut 50 or the standard six-cornered lug nut 80 used in auto racing, whereupon socket bore 22 receives the lug nut. The lug nut comes in contact with nut seat 25 and/or the socket rim 21 makes contact with a socket stop if provided on the nut or with the wheel being removed if the length of the nut allows. The stud clearance bore 24 provides clearance for the stud as the lug nut is being removed or replaced thereon. The socket bore 22 may be sized to permit some play between the lug nut socket and the lug nut. Thus, when the lug nut socket is stationary, it may be readily shifted and moved about the lug nut. When the lug nut socket is rotated, the point pins 42 engage and make contact with the engagement surfaces on the lug nut. In one preferred embodiment, the point pin wells, and therefore the point pins, are diametrically opposed to one another. When the lug nut socket is rotated, the engagement pins 42 will engage point surfaces on the lug nut which are also generally diametrically opposed to one another. In use, the point pins do not make contact precisely at the lug nut points, but rather, make contact along the adjoining surfaces which form the lug nut points.

The point pins may be constructed of a material which absorb the wear and tear when the lug nut socket is in operation. When the point pins become worn they may be easily removed and replaced with new point pins by simply removing the retainer. Thus wear and tear on the lug nut, the socket head, and socket bore in particular, may be minimized.

Figure 12:
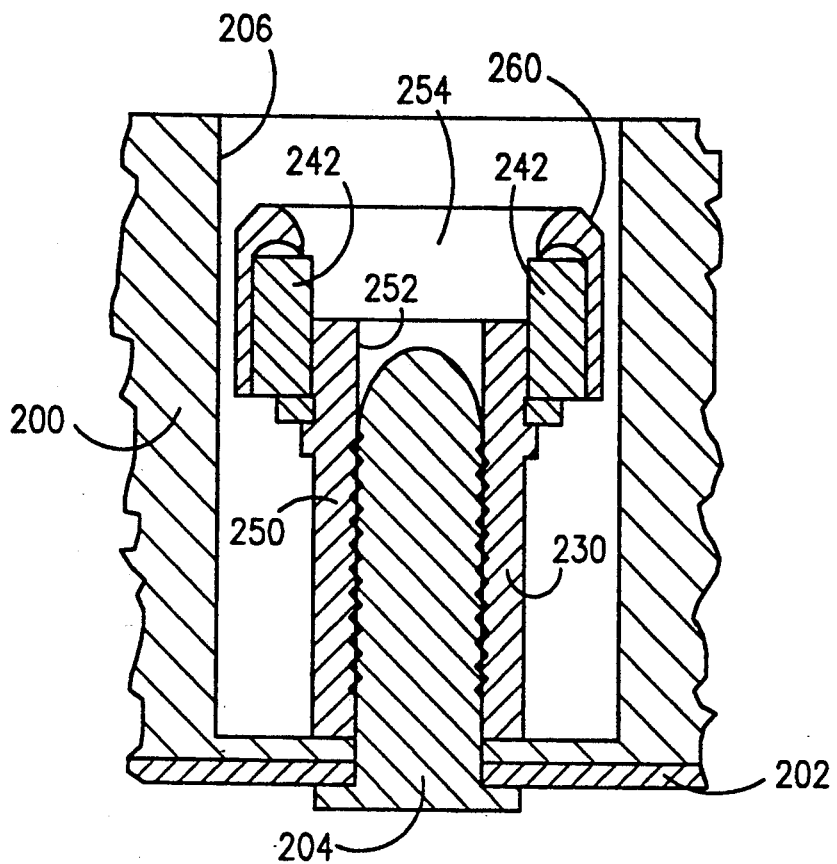
FIG. 12 is a crosssectional view of an alternate preferred embodiment of a lug nut according to the present invention in position holding a wheel to a stud.
Figure 13:
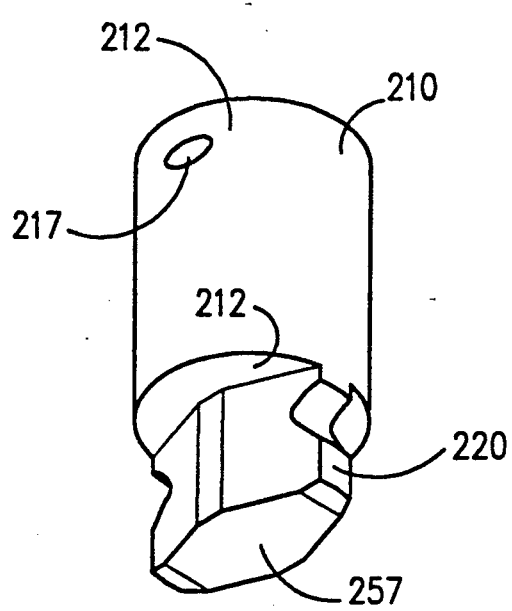
FIG. 13 is a perspective view of an alternate preferred embodiment of a socket according to the present invention for use with the lug nut of FIG. 12.

Refer now to FIGS. 12 and 13, there being shown another preferred lug nut and socket arrangement according to the present invention. Some wheels 200 have deep wells 206 in which the lug stud 204 extends. A nut threads on the stud 204 to hold the wheel 200 to the car wheel hub 202. The preferred embodiment of FIGS. 12 and 13 is particularly suitable for use with such a deep well wheel arrangement. In this embodiment, the lug nut 250 is configured similar in many respects to the socket 10 described above. And the socket 210 is configured similar in many respects to the nut 50 described above. Consequently, many of the socket and nut features have been reversed to provide for use of the invention within the dimensional constraints of the well 206.

The head 260 of the nut 250 is constructed similar to the head 20 of the socket 10. However, the neck 230 has a bore 252 threaded over at least a portion of its length for engaging the stud 204. The head 220 of the socket 210 is constructed similar to the nut 50 between its surface 51 and its end 57 except that the end 257 of the socket 210 is solid. The socket 210 includes a drive receptacle (not shown) in its end 212. A threaded bore 217 is shown for accepting a locking bolt similar to and bolt 43 described above. In operation, the socket head 220 is inserted into the bore 254 and engages the point pins 242 in the manner described above.

The present invention greatly reduces the amount of time required to change tires during pit stops due in part to the two socket engaging portion nut design and in part due to the two-point pin socket construction. With the present invention the lug nut socket can be rotating at relatively high speeds and still effectively engage the lug nut for removal or replacement. Thus, crew operators need not initiate the tire changing sequence with a stationary or non-stationary lug nut socket.

As shown, the socket neck 30 has a lesser diameter than that of the socket head 20. Other relative dimensions may be used to decrease socket and/or nut weight or for other reasons.

In one preferred embodiment, the head 20 and flange 37 have larger diameters than the neck surface 34. The rear surface 41 has point pin wells 40 extending therethrough and into the socket wall 26. In the preferred embodiment, the point pin wells 40 extend axially into the socket wall 26, however, the wells could extend radially or at some other orientation relative to the socket head 20.

The wells 40 and pins 42 are preferably round for strength, ease of fabrication, and to allow the pins to rotate within the well during use to absorb energy and decreased deformation of the pins and the nuts. However, other shapes, such as square or triangular could be employed. Moreover, external devices could be used to hold the pins in the wells, such as set screws or pins. Non-removable protrusions could also be used.

The above description is only illustrative of preferred embodiments which achieve the objects, features and advantages of the present invention, and it is not intended that the present invention be limited thereto. Any modification of the present invention which comes within the spirit and scope of the following claims is considered part of the present invention.

What is new and desired to be protected by Letters Patent of the United States is:

I claim:

1. A nut comprising: a body; a bore extending through said body and being threaded over at least a portion of its length; only two or three socket engaging portions of a greater diameter than other portions of the outside of said nut formed on the outside of said nut at approximately equal angular spacing.

2. A nut as in claim 1 wherein there are two socket engaging portions at approximately one hundred and eighty degrees angular spacing.

3. A nut as in claim 1 wherein there are three socket engaging portions at approximately one hundred and twenty degrees spacing.

4. A socket and nut system comprising: a socket and a nut; said nut including a body, a bore extending through said body and being threaded over at least a portion of its length, and including two or three socket engaging portions of a greater diameter than other portions of the outside of said nut formed on the outside of said nut at approximately equal angular spacings; a socket including a socket head having a socket bore for receiving said nut, and at least one point pin protruding within said socket bore for engaging said socket engaging portions of the nut.

5. A lug nut socket for use with a drive tool to turn a nut having socket engaging portions onto a stud comprising:
   (a) a socket head having a socket bore for receiving the lug nut, a socket shoulder for guiding said socket bore to engage the nut, and a rear surface;
   (b) means for engaging the socket engaging portions of the nut;
   (c) a socket neck integrally connected to said socket head adjacent to said rear surface, said socket neck having a drive seat surface for contacting a drive tool;
   (d) a drive receptacle axially extending through the drive seat surface along a portion of said socket neck;
   (e) a stud clearance bore interposed between said socket bore and said drive receptacle for receiving stud during operation of said lug nut socket; and
   (f) means for securing lug nut socket to said drive tool.

6. A socket as in claim 5 wherein said lug nut engaging means includes a plurality of point pin wells extending through said rear surface and substantially through said socket wall, said point pin walls overlapping said socket bore.

7. A lug nut socket as in claim 6 wherein said point pin wells includes a first and second point pin well diametrically opposed to one another.

8. A lug nut socket as in claim 5 wherein said means for securing said lug nut engaging means includes an outer flange located along said socket neck, said flange being offset a short distance from said rear surface where said socket neck joins said socket head, a removable retainer interposed between said flange and said rear surface, said retainer overlapping with said point pin wells thereby preventing said point pins from withdrawal during operation or handling.

9. A lug nut socket as in claim 5 wherein said drive securing means includes a first and second radial bore extending from the drive receptacle through the socket neck wall.

10. A lug nut socket as in claim 9 wherein said first radial bore is positioned to receive a spindle button located on the spindle of a drive tool.

11. A lug nut socket as in claim 9 wherein said second radial bore is diametrically opposed to said first radial bore, said second radial bore being threaded to receive a locking bolt.

12. A lug nut socket comprising:

(a) a cylindrically shaped socket head having an outer diameter, a socket bore for receiving a lug nut, a nut seat for contacting said nut, a socket shoulder for guiding said lug nut into said socket bore, a stud clearance bore a front rim adjacent to said socket shoulder, a rear surface axially opposed to said front rim, a socket wall interposed between said socket bore and said outer diameter;

(b) a first point pin well extending axially through said rear surface and substantially through said socket wall and a second point pin well extending axially through said rear surface and substantially through said socket wall, said first point pin well being diametrically opposed to said second point pin well, said point pin wells partially overlapping with said socket bore;

(c) a cylindrically shaped socket neck axially centered and integrally connected with said socket head and immediately adjacent to said rear surface of said socket head, an outer neck diameter, an axial drive receptacle for engaging a drive tool, a drive seat for contacting said drive tool, a neck wall interposed between said drive receptacle and said outer neck diameter;

(d) a first radial bore located in the upper portion of said socket neck extending through said neck wall for engaging a set pin positioned on said drive tool spindle, and a second radial bore threaded and diametrically opposed to said first bore for receiving locking bolt to firmly secure lug nut socket to drive tool spindle during operation;

(e) a snap ring flange positioned along the outer diameter of said socket neck, said flange being axially offset a short distance along the length of said socket neck away from said rear surface of said socket head;

(f) a first removable point pin inserted into said first point pin well and a second removable point pin inserted into said second point pin well, said point pins thereby protruding within said socket bore, said point pins fitting snugly within said point pin wells; and (g) a removable snap ring positioned about said socket neck directly below and in contact with said snap ring flange and in close proximity with said point pins thereby preventing said point pins from falling out of the lug nut socket.

* * * * *